United States Patent
Piffaretti

(12) 
(10) Patent No.: US 6,537,377 B1
(45) Date of Patent: Mar. 25, 2003

(54) APPARATUS FOR COATING OPTICAL FIBERS

(75) Inventor: Jose G. Piffaretti, Conover, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/390,022

(22) Filed: Sep. 3, 1999

(51) Int. Cl.$^7$ ................................................. B05C 3/12
(52) U.S. Cl. ....................................... 118/420; 118/125
(58) Field of Search .............................. 118/420, 125, 118/DIG. 18; 425/113, 461; 65/529

(56) References Cited

U.S. PATENT DOCUMENTS

| | | | |
|---|---|---|---|
| 3,944,459 A | * | 3/1976 | Skobel ........................ 118/420 |
| 4,046,103 A | | 9/1977 | Yakuboff |
| 4,253,731 A | | 3/1981 | Anderson et al. |
| 4,514,205 A | | 4/1985 | Darcangelo et al. |
| 4,531,959 A | | 7/1985 | Kar et al. |
| 4,594,088 A | | 6/1986 | Paek et al. |
| 4,649,856 A | | 3/1987 | Shannon et al. |
| 4,678,274 A | | 7/1987 | Fuller |
| 4,955,689 A | | 9/1990 | Fuller et al. |
| 5,043,001 A | | 8/1991 | Cain et al. |
| 5,151,306 A | | 9/1992 | Andrews et al. |
| 5,186,870 A | | 2/1993 | Fuller et al. |
| 5,366,527 A | | 11/1994 | Amos et al. |
| 5,648,139 A | | 7/1997 | Sussmann et al. |

FOREIGN PATENT DOCUMENTS

| | | |
|---|---|---|
| DE | 198 01 700 A1 | 1/1998 |
| GB | 1371318 | 10/1974 |
| GB | 2 170 738 A | 8/1986 |
| WO | WO/9720237 A2 | 6/1997 |

OTHER PUBLICATIONS

CRC Handbook of Chemistry and Physics CRC Preso, Inc Boca Raton, FLA (1985) p. F19.*

* cited by examiner

Primary Examiner—Brenda A. Lamb
(74) Attorney, Agent, or Firm—Sughrue Mion, PLLC

(57) ABSTRACT

A coating die that includes an insert having a high thermal conductivity, which is greater than 1 W/cm*K. Preferably, the insert is made of diamond having a thermal conductivity in the range of 5 to 20 W/cm*K. Use of this highly conductive insert helps to efficiently dissipate the heat produced by viscous losses in the coating as most of these losses occur very close to the inner wall of the die in the land region. It also reduces to negligible level the wall temperature unbalance between opposite sides of the fiber when this fiber is off-centered thus restoring conditions prevailing at low draw rates and subsequent satisfactory centering force.

6 Claims, 4 Drawing Sheets

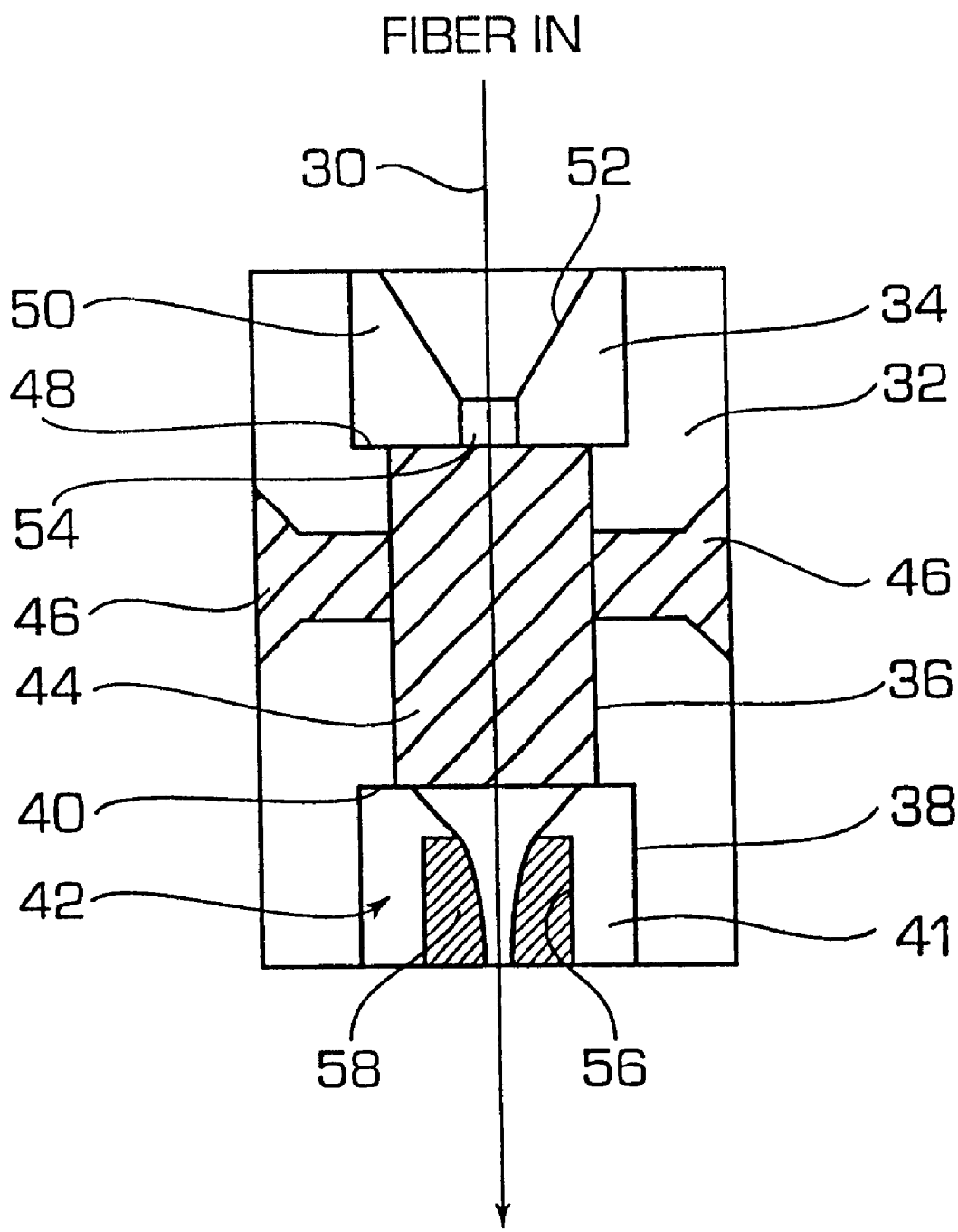

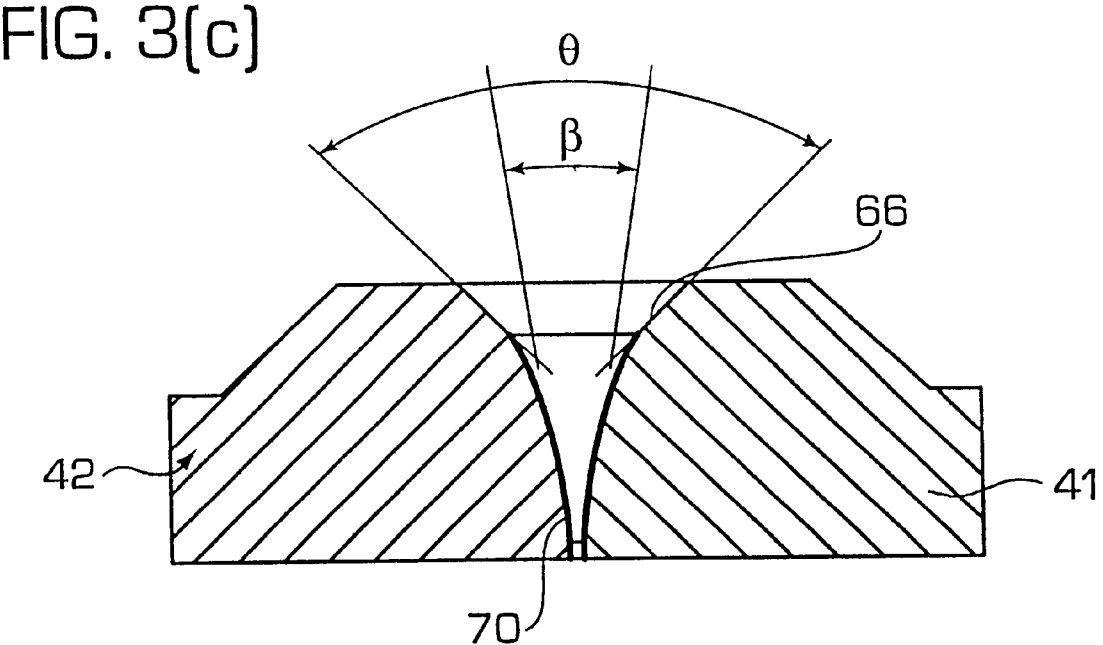

APPARATUS FOR COATING OPTICAL FIBERS

BACKGROUND OF THE INVENTION

1. Field of the Invention

The present invention relates to an apparatus for coating optical fibers such that the coating is concentrically applied and the thickness of the coating is uniform.

2. Discussion of Related Art

After an optical fiber has been drawn from a preform, it is conventional to cover the optical fiber with a protective coating, such as an acrylate-based composition which is curable by exposure to ultraviolet (UV) light, to prevent the surface of the fiber from being damaged either during the subsequent manufacturing steps or subsequent use. This coating step is generally performed as an integral part of the drawing process using coating dies. The coating material may be applied in one or more layers.

In the process of applying the coating layers, it is important that the coating layers be applied concentrically to the fiber and that the diameter of the coating or coatings be consistent as well. These features are important in contributing to the ease with which the optical fibers can be spliced and connected.

As discussed in U.S. Pat. No. 5,366,527 to Amos et al., which is incorporated herein by reference, significant efforts have been made to ensure that the coating is applied concentrically and ever more consistently at increasing draw rates. Higher draw rates are needed to reduce the cost of manufacturing and to increase the fiber output but they may affect adversely the consistency of fiber coating if draw techniques fail to be adequately adapted.

A direct consequence of draw rate increase is to reduce the delay between fiber forming at temperatures close to 2000° C. and fiber coating. As a consequence, the temperature of the fiber entering the coating device may still be too high to allow good coating application unless forced cooling is applied. Various systems have been disclosed in U.S. Pat. No. 4,594,088 to Paek et al., U.S. Pat. No. 4,514,205 to Darcangelo et al. and U.S. Pat. No. 5,043,001 to Cain et al. for cooling the drawn optical fiber prior to receiving the first layer of coating.

High temperature of the entering fiber is not the only source of heat likely to disturb coating application: draw rate increase also results in an important increase in the heat produced by viscous losses in the coating flow. Thermal power associated with viscous losses may be computed easily knowing the draw speed and the viscous drag affecting the fiber in the coating applicator. Thermal power produced at current draw speeds of 900 to 1000 m/min for an observed drag force per applicator of 1 N is around 15 W. None of the above systems was designed to cope with or to get rid of this overly different source of heat.

Viscous losses occur most intensively where shear stress is highest in the coating flow, i.e. around the fiber in the applicator chamber and, especially, in the narrowest part of the sizing die, the cylindrical land region. In the latter land region, high shear rate and viscous losses are shown to be concentrated in a narrow radial range limited by the inner wall of the die. This is a consequence of optimal coating conditions in which shear rate is minimized around the fiber and is highest on the inner wall of the die as a consequence. Heat production is highest over this peripheral region.

This heat source may be especially detrimental to coating consistency as coating diameter and coating concentricity are mostly governed by temperature and pressure profiles in the land region as shown by numerical simulations. This fact is indirectly confirmed by U.S. Pat. No. 5,366,527 which discloses a technique by which the coating diameter is controlled by adjusting the die temperature in the land region and by PCT Publication No. WO 97/20237-A2 which discloses a fiber coating system in which concentricity of the coating is controlled by non-axisymmetrically heating the land region in the sizing die. The latter system may be capable of compensating for spurious non-axisymmetrical heating or temperature profiles occurring in the coating flow. However, these systems are very complex requiring the ability to monitor the diameter and/or the concentricity of the coating as well as the ability to control the temperature of the coating die in a localized manner (e.g., portions of the bottom surface of the die).

An object of the present invention is to provide a relatively simple apparatus for coating an optical fiber with coatings that are applied concentrically to the fiber to provide a consistent coated diameter.

An other object of the invention is to restore as much as possible coating conditions prevailing at low draw rates and to suppress most of the effect of viscous loss rather than compensate it by means of feedback.

SUMMARY OF THE INVENTION

These and other objects of the invention have been achieved by providing a coating die that includes an insert having a high thermal conductivity, which is greater than 1 W/cm*K. According to the preferred embodiment, the insert is made of diamond having a thermal conductivity in the range of 5 to 20 W/cm*K.

Use of this highly conductive insert helps dissipate most efficiently the heat produced by viscous losses in the coating as most of these losses occur very close to the inner wall of the die in the land region.

It also reduces to negligible level the wall temperature unbalance between opposite sides of the fiber when this fiber is off-centered thus restoring conditions prevailing at low draw rates and subsequent satisfactory centering force.

It has been discovered that the high conductivity of the insert minimizes the differences or imbalances between the inner wall temperatures of the die so that the temperature of the inner wall is generally uniform. Therefore, the affects discussed above with regard to the generation of de-centering forces due to the variation in wall temperature is substantially reduced or even eliminated. In particular, whereas localized heat generated due to a non-uniform viscosity profile is relatively high in a die having a low thermal conductivity due to poor heat dissipation, the heat generated in a die having a high conductivity is quickly dissipated such that temperature uniformity is substantially improved. Therefore, even if one side of the fiber begins to be offset toward the adjacent wall of the die, there is a minimal temperature increase on that side of the fiber. As a result, the viscosity and pressure profile around the fiber remains generally uniform around the fiber in the land region so that the fiber is not drawn to one side and centering can be restored as best as possible by the centering force generated in the tapered region of the die.

BRIEF DESCRIPTION OF THE DRAWINGS

FIG. 2 is a cross-sectional view of the coating applicator of the present invention; and FIGS. 3(a)–(c) are cross-sectional views showing the sizing dies associated with different embodiments of the invention.

DETAILED DESCRIPTION OF THE INVENTION

The following description of preferred embodiments of the invention is offered for purposes of illustration of the principles of this invention and it is not intended to be limiting.

Figure 1:
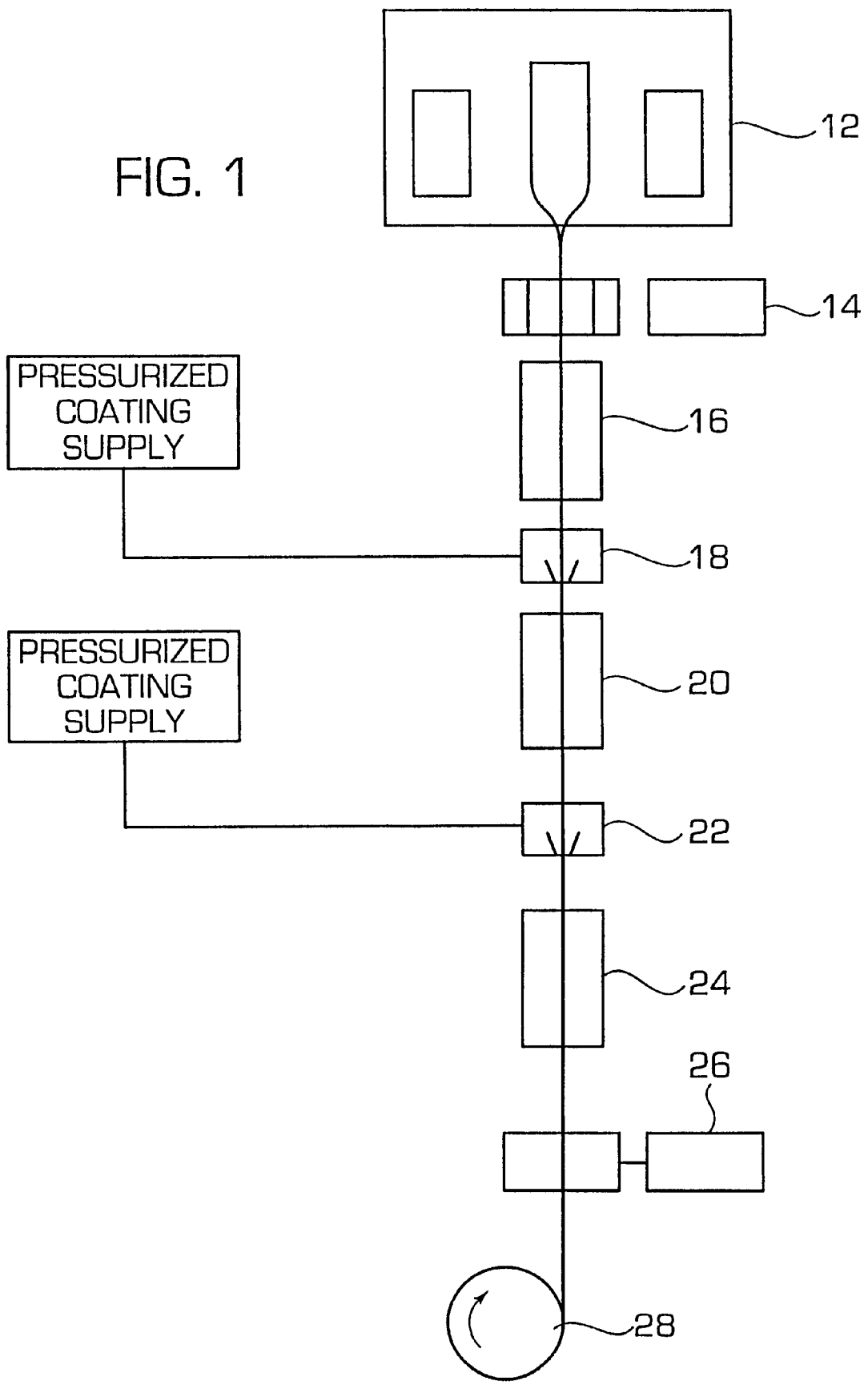
FIG. 1 is a schematical illustration of a fiber drawing and coating apparatus according to the present invention.

FIG. 1 is a schematic illustration showing the basic structure of a fiber forming and coating line 10. The line 10 includes an optical fiber forming device 12, a fiber diameter measurement device 14, a fiber coating device 16, a primary coating applicator 18, a primary coating curing device, 20, a secondary coating applicator 22, a secondary coating curing device 24, a coated fiber diameter measurement device 26 and a capstan 28. Optical fiber 30 is drawn from the fiber forming device 12 and passes through the fiber diameter measurement device 14 which measures the diameter of the optical fiber 30. The fiber 30 then passes through primary coating applicator 18 where it is coated with a primary layer. The primary coating is then cured by the primary coating curing device 20 and the fiber 30 is then passed through the secondary coating applicator 22 where a secondary coating layer is applied. The secondary coating is then cured by the secondary coating curing device 24, after which the final diameter of the coated optical fiber is measured by the measurement device 26. The optical fiber 30 is then wound around capstan 28 and onto a spooling device (not shown).

The present invention is directed to the design of the primary coating applicator 18, illustrated in FIG. 2. FIG. 2 is a cross-sectional view of coating applicator 18. The coating applicator 18 includes a cylindrically-shaped main housing 32 having longitudinally-spaced, coaxial bores 34, 36 and 38 extending longitudinally therethrough. The main housing 32 may be formed of steel or stainless steel or any machinable metal or the like. Bores 36 and 38 meet to form an inwardly projecting shoulder 40 upon which sizing die 42 is seated. Immediately above sizing die 42 is a cylindrical, flow distribution area 44 to which the coating is supplied via inlets 46. Bores 34 and 36 also meet to form a shoulder 48 upon which a guide die 50 is seated. The guide die 50 is conventional and includes a tapered longitudinal aperture 52 followed by a cylindrical aperture corresponding to a guide die orifice 54. The presence of guide die orifice 54 facilitates the initial feeding of fiber 30 through the coater. It causes an inserted fiber to be centered so that it will readily pass through the coater without becoming snagged. The orifice 54 is sufficiently large that the fiber does not come into contact with it during the fiber drawing and coating operation.

Figure 3A:
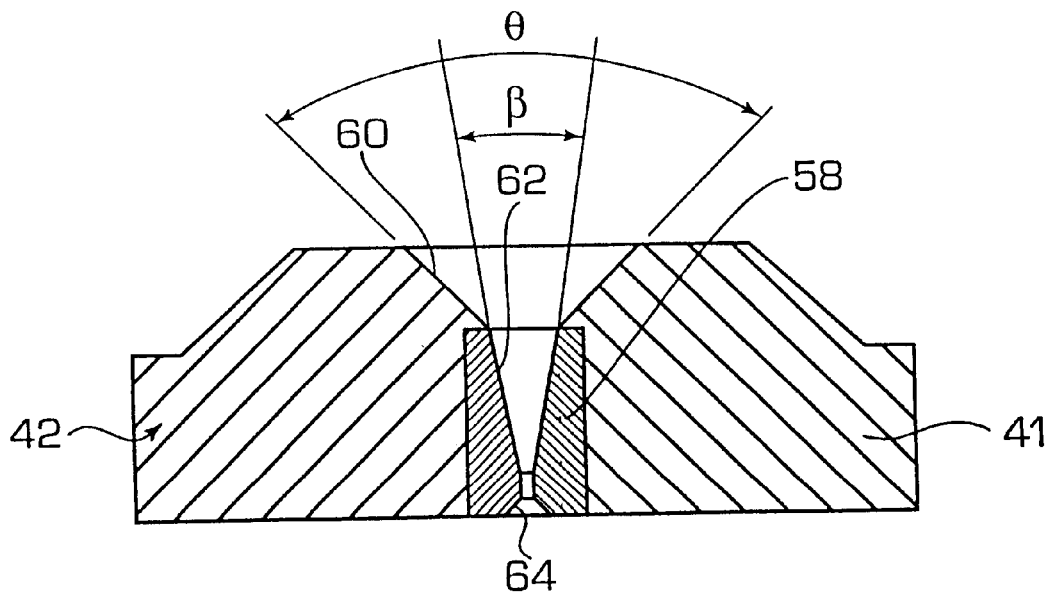

The sizing die 42 includes a die housing 41 having a bore 56 in which a diamond insert 58 is located. With reference to FIGS. 3(a) and 3(c), there are three alternative designs for the sizing die. Referring to FIG. 3(a), according to a first embodiment, the inlet end the sizing die 42 includes a first tapered aperture 60 having a wide opening defined by a relatively wide angle θ (of approximately 90°). In contrast, the diamond insert 58 includes a second tapered aperture 62 having a relatively narrow opening defined by an angle β (of approximately 12°) followed by a cylindrical land opening 64. Thus, in this embodiment, the heat conductive diamond insert 58 includes both the tapered region 62 and the land region 64 of the sizing die. Thus, wall continuity and smoothness is ensured in all locations that are contacted by the high speed and high shear rate coating flow. Flow eddies are thus avoided.

Figure 3B:
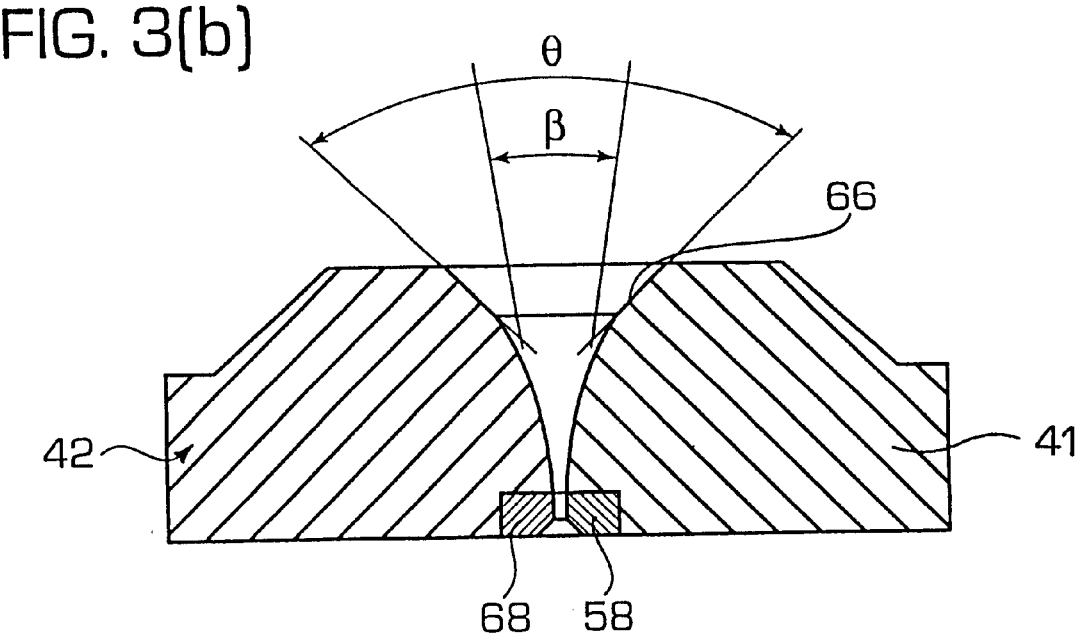

The extension of the insert to include part of the tapered region 62 of the die is beneficial but not essential for heat transfer. For example, referring to FIG. 3(b), according to a second embodiment, the sizing die 42 includes a single tapered opening 66 that is initially defined by a relative wide angle θ (approximately 90°) but tapers down to a smaller angle β (approximately 12°). The insert 58 is located on the downstream side of the sizing die 42 and includes just a land region 68 having a sizing orifice 70. The size of orifice 70 is determined by various parameters including the diameter of the optical fiber to be coated, the thickness of the coating and the particular coating material employed.

Thus, in this particular embodiment the heat-conductive insert includes only the cylindrical land region of the sizing die. The sizing die 42 is made of a cast metal, such as cast iron, or a similar machinable material. This design is sufficient to allow dissipation of most of the heat produced by viscous losses as these losses occur mainly over the inner wall of the land region 68 of the die insert 58. Special care must be given to avoid discontinuities of the inner wall at the up stream side of the insert 58. Turbulence in the coating flow may be otherwise initiated, as this limit is located in a region of extreme speed and shear rate in the coating flow. Provided successful manufacturing, this embodiment may be cheaper than state of the art Tungsten Carbide dies.

Referring to FIG. 3(c), a third, altogether different embodiment of the invention could be realized by replacing the heat conductive insert 58 with a sufficiently thick layer 70 of heat conductive material like pyrolithic diamond over part or the entire inner wall of the sizing die.

According to an important aspect of the invention, the die insert 58 in each embodiment is made of a material which has a high thermal conductivity, greater than 1 W/cm*K. Examples of such a material include all varieties of diamond, natural or synthetic (having a thermal conductivity in the range of 5 to 20 W/cm*K) or isotopically pure C12 diamond (with a conductivity of 50 W/cm*K). Another suitable but less performant material could be Silicon Carbide (with a conductivity in the range of 1 to 1.3 W/cm*K at room temperature).

This is in contrast to conventional coating die inserts having a thermal conductivity of only 0.15 W/cm*K. It has been discovered that the high conductivity of the insert minimizes the differences or imbalances between the inner wall temperatures of the die so that the temperature of the inner wall is generally uniform around the circumference of the die insert. Therefore, the effects discussed above with regard to the generation of de-centering forces due to the variation in wall temperature is substantially reduced or even eliminated. In particular, whereas localized heat generated due to a non-uniform viscosity profile is relatively high in a die having a low thermal conductivity due to poor heat dissipation, the heat generated in a die having a high conductivity is quickly dissipated such that localized heating is substantially reduced. Therefore, even if one side of the fiber begins to be offset toward the adjacent wall of the die, there is a minimal amount of heat remaining in the liquid on that side of the fiber. As a result, the pressure profile around the fiber remains generally uniform in the land region so that the fiber is not drawn to one side.

Thus, the present invention provides a much simpler solution that the prior art systems discussed above in which the ability to monitor the concentricity of the coating on-line is required.

Specifically, it has been confirmed by numerical simulation that a die insert having a high thermal conductivity is advantageous in rapidly dissipating heat generated by viscous heating (the result of the conversion of mechanical to thermal energy via fluid friction). Viscous heating tends to occur most where shear rate is highest in the coating flow. In the land region of the sizing die, high shear rate and subsequent heating are highest over the inner wall of the sizing die. This heat can be extracted easily if the heat conductivity of the die is sufficient.

In addition, simulations show that shear rate and viscous dissipation on opposite sides of the fiber become unbalanced if the fiber is off-centered with respect to the sizing-die, a situation which often occurs in actual fiber manufacturing. This initial unbalance induces subsequent unbalances between temperatures, coating viscosities, and pressures on opposite sides of the fiber unless die heat conductivity is sufficiently high to both evacuate heat radially and to conduct it around the inner wall of the die to equalize temperatures as best as possible. Results of simulation show that in case of use of a high conductivity insert substantial centering force is generated in the tapered region of the die pulling back the off-centered fiber. To the contrary, if temperatures on either sides of the fiber are left unbalanced and uncontrolled, flow rates are likely to become in turn unbalanced, especially in the land region, and the global centering force is mitigated producing a loss of coating concentricity.

I claim:

1. An apparatus for coating an optical fiber, comprising:

a coating applicator including a main housing having an inlet for supplying a curable coating material; and a sizing die disposed in said main housing and having a bore with a tapered region and an adjacent land region to which the curable coating material is supplied for applying the coating material to the optical fiber, means for curing said coating material, wherein said sizing-die includes a die housing and an insert, and said insert defines at least said land region of said bore and has a thermal conductivity greater than 1 W/cm*K.

2. The apparatus of claim 1, wherein said insert is a diamond insert.

3. The apparatus of claim 1, wherein said insert defines both said tapered region and said land region of the bore.

4. The apparatus of claim 3, wherein said land region is immediately downstream of said tapered region.

5. The apparatus of claim 1, wherein said tapered region tapers from a relatively wide opening at an entrance portion of said sizing die to a relatively narrow opening downstream thereof.

6. The apparatus of claim 1, wherein said insert is silicon carbide.

* * * * *